(12) United States Patent
Matsuzaki et al.

(10) Patent No.: US 8,666,621 B2
(45) Date of Patent: Mar. 4, 2014

(54) PTO CONTROL SYSTEM

(75) Inventors: Yushi Matsuzaki, Sakai (JP); Susumu Umemoto, Nara (JP); Akira Hiwatashi, Sakai (JP); Shota Nagasawa, Sakai (JP); Suguru Kagawa, Sakai (JP)

(73) Assignee: Kubota Corporation, Osaka (JP)

(*) Notice: Subject to any disclaimer, the term of this patent is extended or adjusted under 35 U.S.C. 154(b) by 466 days.

(21) Appl. No.: 12/725,035

(22) Filed: Mar. 16, 2010

(65) Prior Publication Data

US 2011/0172892 A1 Jul. 14, 2011

(30) Foreign Application Priority Data

Jan. 13, 2010 (JP) ................................. 2010-005285

(51) Int. Cl.
*B60W 20/00* (2006.01)
(52) U.S. Cl.
CPC ................................... *B60W 20/00* (2013.01)
USPC ................. 701/58; 701/51; 701/67; 180/53.1
(58) Field of Classification Search
USPC .................................................... 701/58, 51
See application file for complete search history.

(56) References Cited

U.S. PATENT DOCUMENTS

| 5,123,234 | A | * | 6/1992 | Harada et al. | ............... | 56/10.2 E |
| 5,616,964 | A | | 4/1997 | Peterson, Jr. | | |
| 6,135,230 | A | * | 10/2000 | Schenck et al. | ............... | 180/273 |
| 2005/0204843 | A1 | | 9/2005 | Nishino et al. | | |
| 2006/0089767 | A1 | * | 4/2006 | Sowa | ............... | 701/29 |
| 2007/0221168 | A1 | * | 9/2007 | Katrak et al. | ............... | 123/350 |
| 2008/0135313 | A1 | * | 6/2008 | Onderko et al. | ............... | 180/53.1 |
| 2010/0076634 | A1 | * | 3/2010 | Brigham | ............... | 701/22 |

FOREIGN PATENT DOCUMENTS

| JP | 63165241 U1 | | 10/1988 |
| JP | 2006111125 A | | 4/2006 |
| JP | 2006200575 A | | 8/2006 |
| JP | 2007161025 A | * | 6/2007 |

* cited by examiner

*Primary Examiner* — M. Thein
*Assistant Examiner* — Milena Racic
(74) *Attorney, Agent, or Firm* — The Webb Law Firm

(57) ABSTRACT

A PTO control system for allowing selection between an independent PTO mode and an interlock PTO mode, comprising a mode-switch command input device 11 for giving an instruction on selection between the independent PTO mode and the interlock PTO mode, a PTO setting device 12 having an engaging position for producing an engaging command and a disengaging position for producing a disengaging command of the PTO clutch, and a PTO control unit for controlling a PTO clutch in response to a pedal operational position of a brake pedal, a mode selected by the mode-switch command input device, and a position selected by the PTO setting device. PTO mode switch implementation processing is suspended when the PTO transmission system is in a power transmittable state, while the PTO mode switch implementation processing is permitted when the PTO transmission system is in the power non-transmittable state.

7 Claims, 6 Drawing Sheets

PTO CONTROL SYSTEM

BACKGROUND OF THE INVENTION

1. Filed of the Invention

The present invention relates to a PTO control system to be provided in a work vehicle such as a tractor for transmitting engine power to an external work implement through a PTO (power take-off) transmission system.

2. Description of the Related Art

The above-noted work vehicle is provided with a propelling transmission system for transmitting engine power to drive wheels through a transmission, and the above-noted PTO transmission system. An independent PTO mode and an interlock PTO mode are known as a PTO drive control mode. In the independent PTO mode, a PTO clutch is independently engageable or disengageable regardless of the state of engine power transmission in the propelling transmission system, that is, regardless of whether power transmission is established or broken, which allows power transmission to the work implement to be controlled whether the vehicle is stopped or not. In the interlock PTO mode, control is performed such that the power transmission state of the PTO transmission system is interlocked with the engine power transmission state of the propelling transmission system. Thus, when power transmission in the propelling transmission system is broken, power transmission in the PTO transmission system is also broken, and when power transmission in the propelling transmission system is established, power transmission in the PTO transmission system is also established.

In using the external work implement, some operations are performed preferably in the independent PTO mode and other operations are performed preferably in the interlock PTO mode. Thus, a PTO clutch control device selectable between those modes is known from Japanese Unexamined Utility Model Application Publication No. 63-165241. The PTO clutch control device is provided with a PTO input switch and a mode selection switch. The mode is switchable by the mode selection switch between the interlock PTO mode for disengaging or engaging the PTO clutch in response to a depressing operation or a depression releasing operation of a clutch pedal, and the independent PTO mode for engaging the PTO clutch regardless of the depressing operation of the clutch pedal. This PTO clutch control device allows a PTO clutch solenoid to be driven to engage the PTO clutch when the mode selection switch is moved from the interlock PTO mode to the independent PTO mode with the PTO input switch being turned on. When the mode selection switch is moved to the interlock PTO mode, the PTO clutch is disengaged or engaged in response to the depressing operation or the depression releasing operation of the clutch pedal.

The conventional art disclosed in Japanese Unexamined Utility Model Application Publication No. 63-165241 is disadvantageous in that the PTO clutch in the disengaged state is inadvertently engaged in response to the depressing operation of the clutch pedal to rotate a PTO transmission shaft when the mode selection switch is moved from the interlock PTO mode to the independent PTO mode with the PTO input switch being turned on. In order to avoid such a disadvantage, another PTO clutch control device has been proposed in Japanese Unexamined Patent Application Publication No. 2007-161025 (paragraphs 0002-0007; FIG. 1) which is provided with the PTO input switch and the mode selection switch and switchable by the mode selection switch between the interlock PTO mode for disengaging or engaging the PTO clutch in response to the depressing operation or the depression releasing operation of the clutch pedal, and the independent PTO mode for engaging the PTO clutch regardless of the depressing operation of the clutch pedal. This PTO clutch control device includes disengaged state-maintaining means. When the mode selection switch is moved from the interlock PTO mode to the independent PTO mode with the PTO input switch being turned on, the disengaged state-maintaining means is adapted to maintain the PTO clutch in the disengaged state until the PTO input switch is turned off and then turned on. This arrangement in which the disengaged state-maintaining means is adapted to maintain the PTO clutch in the disengaged state until the PTO input switch is turned off and then turned on eliminates the disadvantage that the PTO clutch is inadvertently engaged to rotate the PTO transmission shaft. However, such a device only having the function of maintaining the PTO clutch in the disengaged state until the PTO input switch is turned off and then turned on after the mode selection switch is moved from the interlock PTO mode to the independent PTO mode cannot necessarily serve the purpose of the operation having a variety of use of the versatile external work implement.

SUMMARY OF THE INVENTION

The present invention has been made having regard to the above-noted circumstances, and its object of the present invention is to provide a PTO control system for achieving PTO clutch control applicable to a variety of use of an external work implement.

In order to achieve the above object, In a vehicle including a propelling transmission system for transmitting engine output to an axle, a brake pedal for placing the propelling transmission system in a power non-transmittable state when operated by a predetermined operational amount or more, and a PTO transmission system for transmitting the engine output to a PTO transmission shaft through a PTO clutch, the vehicle allowing selection between an independent PTO mode in which PTO power is transmitted through the PTO transmission system regardless of whether the propelling transmission system is in a power transmittable state or in the power non-transmittable state, and an interlock PTO mode in which the PTO power is transmitted only when the propelling transmission system is in the power transmittable state, a PTO control system mounted on the vehicle comprising:
- a mode-switch command input device for giving an instruction on selection between the independent PTO mode and the interlock PTO mode;
- a PTO setting device having an engaging position for producing an engaging command and a disengaging position for producing a disengaging command of the PTO clutch; and
- a PTO control unit for controlling the PTO clutch in response to a pedal operational position of the brake pedal, a mode selected by the mode-switch command input device, and a position selected by the PTO setting device;

wherein PTO mode switch implementation processing by the mode-switch command input device is suspended when the PTO transmission system is in the power transmittable state, while the PTO mode switch implementation processing by the mode-switch command input device is permitted when the PTO transmission system is in the power non-transmittable state.

With this arrangement, the command for switching the mode to the independent PTO mode is suspended when the PTO transmission system is in the power transmittable state, and then approved when the PTO transmission system becomes in the power non-transmittable state to implement the PTO mode switch. This allows the operator to perform the PTO mode switching operation being aware of the power transmission state of the PTO transmission system. In addition, PTO clutch control is based on the three operational inputs of the pedal operational position of the brake pedal of the vehicle, the mode selected by the mode-switch command input device, and the position selected by the PTO setting device, and thus applicable to a variety of use of the external work implement.

It is preferable that information concerning suspension of the mode switch command is provided to the operator when the mode switch command is suspended. This allows the operator to get the information concerning suspension of the mode switch command given by the operator. The information concerning suspension of mode switch may be effectively provided to the operator visually, aurally or both.

In order to restrain unintentional and unexpected change in the operation of the PTO transmission system as a result of the inadvertent operation of switching the PTO mode, one preferable mode of the present invention proposes that the PTO mode switch implementation processing based on the PTO mode switch command provided by the mode-switch command input device is performed after a predetermined delay.

A specific preferable mode of the PTO system having the above-noted various functions further comprises a PTO electric control unit including a PTO clutch control section for producing a control signal of the PTO clutch, and an operational input signal processing section for processing operational input signals from the mode-switch command input device, the PTO setting device and a brake sensor for detecting the pedal operational position, and outputting an implementation command for requesting the PTO clutch control section to produce the control signal, wherein the operational input signal processing section is provided with a storing section for storing data of the latest state of the PTO setting device and/or data of the latest state concerning power transmission of the PTO transmission system, or both, and wherein the implementation command is outputted based on the data of the latest state stored in the storing section and the operational input signal from the mode-switch command input device.

With such an arrangement, each function of the PTO control unit can be performed by substantially running the program, as a result of which, the system is built having high adaptability to various specifications required for a variety of use of the external work implement.

When the data of the latest state concerning power transmission of the PTO transmission system is stored based on the control signal produced by the PTO clutch control section as a further preferable embodiment, it is possible to store the updated power transmission state of the PTO transmission system at all times as part of PTO clutch control. Alternatively or additionally, the data of the latest state concerning power transmission of the PTO transmission system may be stored based on an operational input signal from a brake sensor for detecting the pedal operational position. Since the pedal operation position of the brake pedal is in liaison with PTO clutch control, the operation of the brake pedal can be associated with PTO clutch control, and eventually with PTO mode-switch control, which contributes to application of the present system to a variety use of the external work implement.

DETAILED DESCRIPTION OF THE PREFERRED EMBODIMENTS

Embodiments of the present invention will be described hereinafter with reference to the accompanying drawings.

Figure 1:
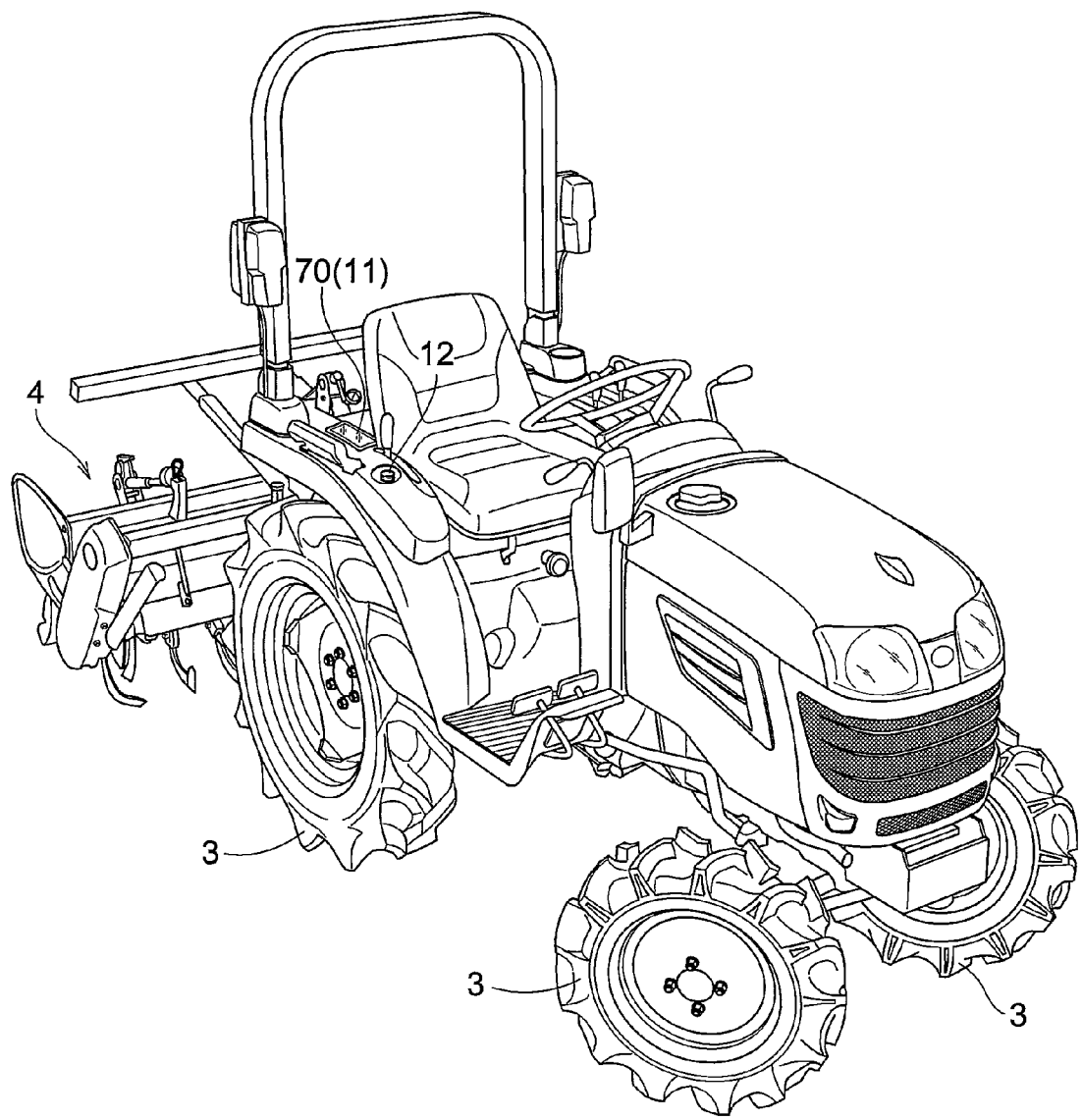
FIG. 1 is a perspective view of a tractor equipped with a PTO control system in accordance with the present invention.
Figure 2:
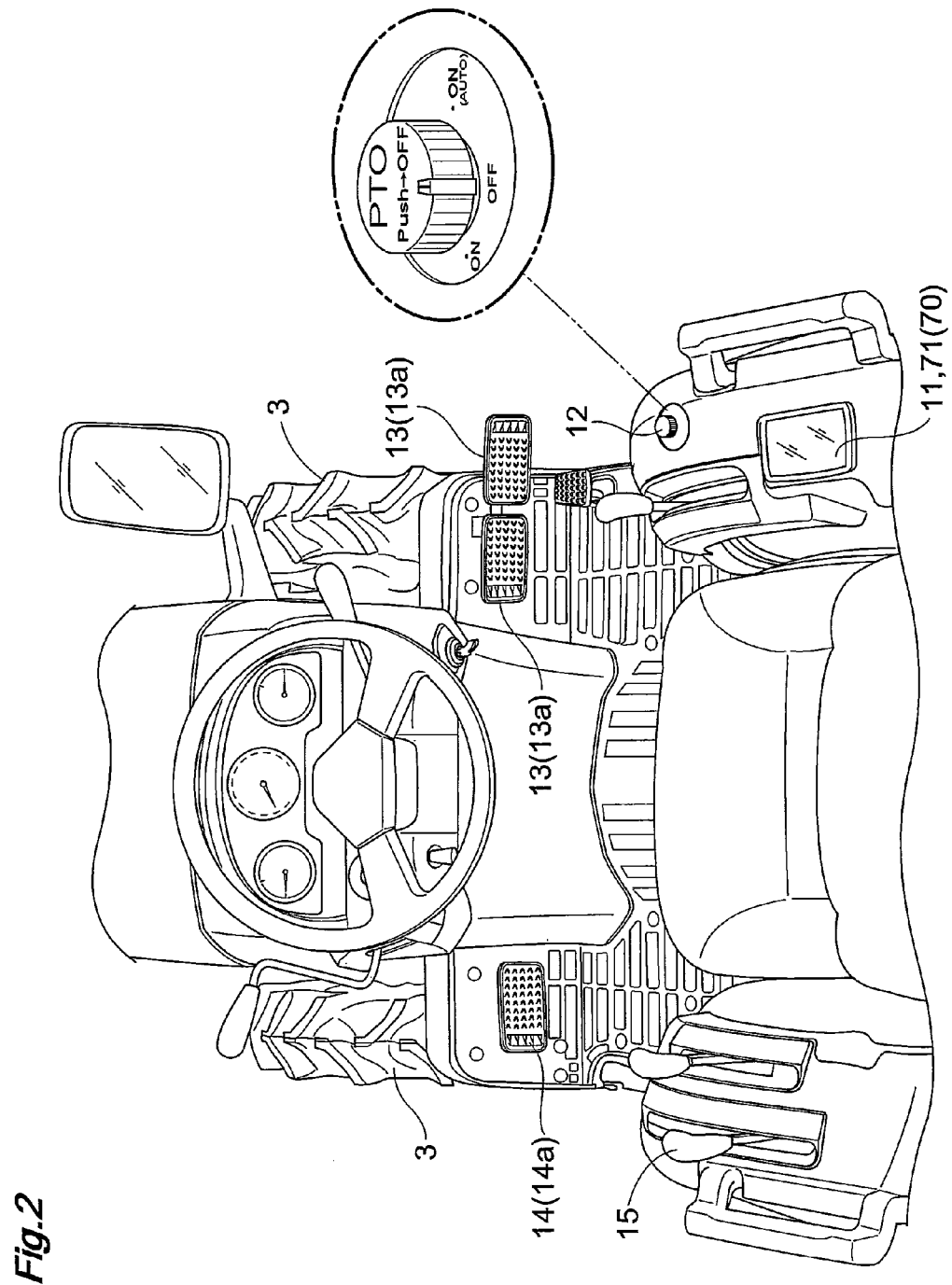
FIG. 2 is a bird's-eye view showing a driver's operating area including a PTO switch, brake pedals and a display panel with a touch panel provided in a driver's section of the tractor.

FIG. 1 is a perspective view of a tractor serving as a work vehicle employing a PTO (power take-off) control system in accordance with the present invention. FIG. 2 is a bird's eye view showing control instruments and control panels provided in a driver's section of the tractor for driving and operating the tractor. In the present embodiment, the tractor is equipped with a rotary tiller provided rearwardly thereof to be vertically movable and acting as an external work implement 4. The tractor is driven and operated through the various control instruments provided in the driver's section. The control instruments associated with operations of a PTO transmission system for transmitting power to the external implement 4 include brake pedals 13 for a brake unit braking an axle to stop a vehicle, a stop pedal 14 for breaking power transmission in a propelling transmission system to stop the vehicle, a PTO switch 12 (simply referred to as a PTO-SW hereinafter) acting as a PTO setting device for establishing or breaking power transmission in the PTO transmission system, a PTO shift lever 15 for a two-speed change operation in the PTO transmission system, and a touch panel 11 acting as a PTO mode switch command input device that serves as a display panel 70 with a liquid crystal display (LCD) 71, for example.

Figure 3:
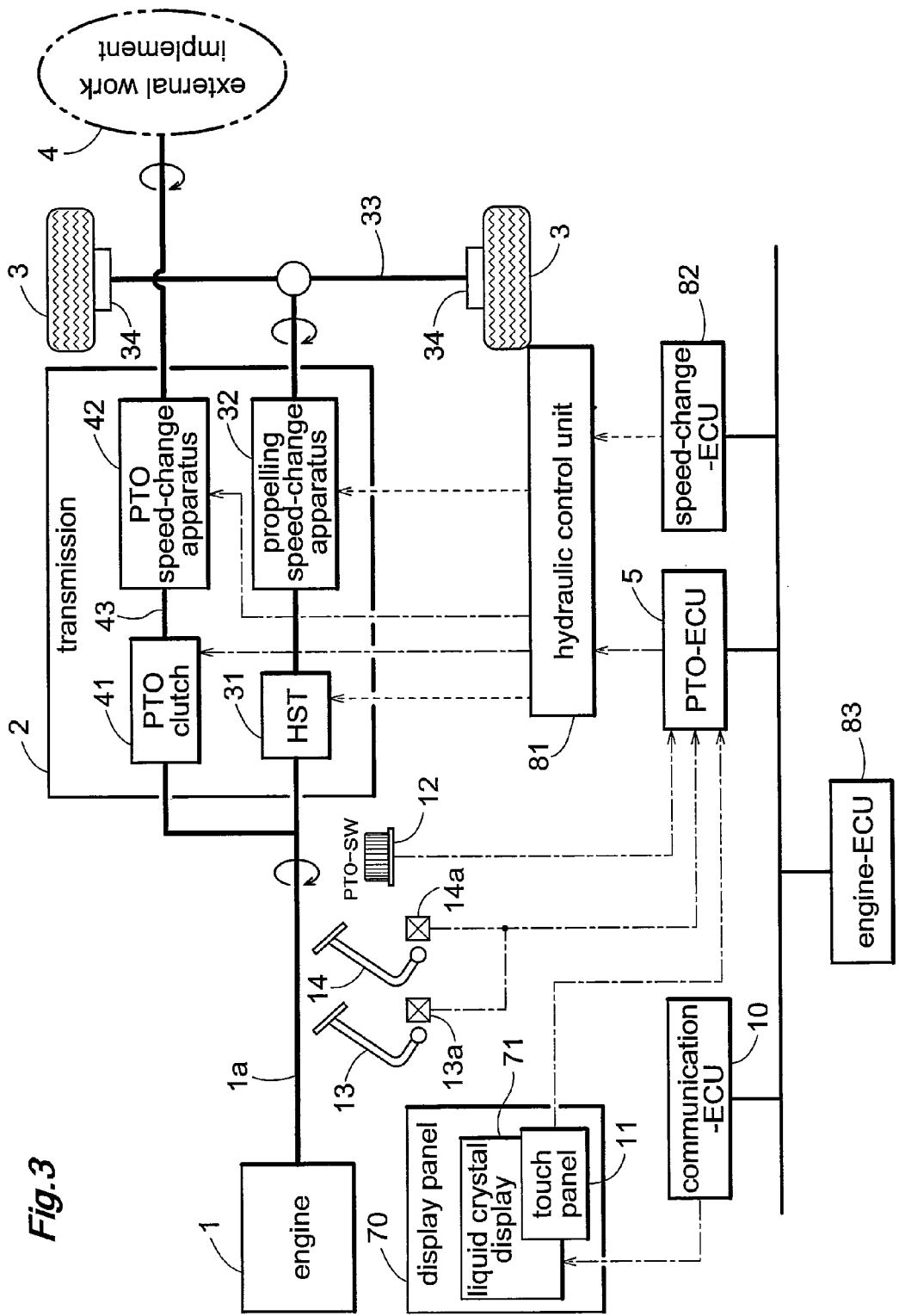
FIG. 3 is a schematic view showing a propelling transmission system and a PTO transmission system of the tractor.

As apparent from FIG. 3 that schematically shows the propelling transmission system and the PTO transmission system of the tractor, power from an output shaft 1a of an engine 1 is transmitted to drive wheels 3 through the propelling transmission system, and to the rotary tiller 4 as well through the PTO transmission system. The propelling transmission system includes a hydrostatic transmission-type stepless speed-change apparatus 31 (simply referred to as an HST hereinafter) and a multi-speed gear-type propelling speed-change apparatus 32, while the PTO transmission system includes a PTO transmission shaft 43, a PTO clutch 41 for establishing and breaking power transmission in the PTO transmission system, and a two-speed gear-type PTO speed-change apparatus 42. As the PTO setting device, the above-mentioned PTO-SW 12 has two selectable positions; an engaging position for producing an engaging command (engaging switch signal) and a disengaging position for producing a disengaging command (disengaging switch signal), both the commands being given to the PTO clutch 41.

The elements for the speed-change mechanism such as the HST 31, propelling speed-change apparatus 32, PTO clutch 41 and PTO speed-change apparatus 42 are housed in a transmission 2. As well known, the HST 31 includes a variable displacement hydraulic pump and a hydraulic motor each of axial plunger type, and is adapted to change an angle of a swash plate in the hydraulic pump rotated at a constant rate by the output shaft 1a to vary a discharge direction and a discharge rate of pressure oil thereby to rotate an output shaft of the hydraulic motor receiving the pressure oil forward or backward steplessly for speed change. Power from the hydraulic motor is further speed-changed by the propelling speed-change apparatus 32 as necessary and transmitted to the axle 33 through a differential mechanism to drive the drive wheels 3.

The PTO transmission system allows power to detour or pass through the HST 31 from the output shaft 1a of the engine 1 and reach the external work implement through the PTO clutch 41 and the PTO speed-change apparatus 42. Thus, it is possible to transmit power from the output shaft 1a of the engine 1 to the rotary tiller 4 as it is regardless of a power transmission state of the propelling speed-change system.

As well known, speed-change control for controlling the angle of the swash plate in the HST 31, speed-change control of the propelling speed-change apparatus 32, engagement/disengagement control of the PTO clutch 41, and speed-change control of the PTO speed-change apparatus 42 are performed by hydraulic control by a hydraulic control unit 81. FIG. 3 shows that the system is provided with, as an electric control unit (ECU) for transmitting a control signal to the hydraulic control unit 81, a PTO control unit (referred to as a "PTO-ECU" hereinafter) 5 for the PTO transmission system, and a speed-change control unit (referred to as a "speed-change ECU" hereinafter) 82 for the propelling transmission system, for example. It should be noted that the PTO-ECU 5 and the speed-change ECU 82 are shown as separate elements for facilitating illustration but may be formed integrally with each other. Those ECUs are connected to each other through an on-board LAN. To the on-board LAN are also connected an engine-ECU 83 and a communication-ECU 10 that has a function of displaying various information on the liquid crystal display 71 of the display panel 70 and a function of providing various information by voice through an unillustrated speaker.

To the PTO-ECU 5 are connected pedal sensors 13a and 14a for detecting depressed positions of the brake pedals 13 and the stop pedal 14 as the operational positions, the touch panel 11, and the PTO-SW 12, those elements serving as devices for transmitting a PTO operational input signal to the PTI-ECU 5.

The brake pedals 13 are known as a unit of the right and left brake pedals that are arranged side by side. The pedal sensors 13a are adapted to detect the depressed positions of the brake pedals 13 only when the right and left brake pedals are simultaneously depressed based on an angle corresponding to an amount of depression (operational positions), and transmit the detection data to the PTO-ECU 5 as a sensor signal. The stop pedal 14 has a function to forcibly bring the HST 31 into a neutral state to shut off the propelling transmission system. The pedal sensor 14a is adapted to detect the depressed position of the stop pedal 14 and transmit the detection data to the PTO-ECU 5 as a sensor signal. Since the stop pedal 14 is dealt with as the control device for braking the vehicle in the same manner as the brake pedals 13 here, only the explanation on the brake pedals 13 will be given hereinafter as common to the stop pedal 14.

The PTO-SW 12 is formed as a depressable rotary knob and has three operational positions of "ON", "OFF" and "AUTO-ON" as seen from an enlarged view of FIG. 2. The knob may be moved to the positions of "ON" and "AUTO-ON" in a depressed state.

When the PTO-SW 12 is further pressed down in that state, the PTO-SW 12 is pushed up to establish an "OFF" state. The PTO clutch 41 becomes ON (engaged) when the knob is brought to the position "ON", while becoming OFF (disengaged) when the knob is brought to the position "OFF". When the knob is moved to the position "AUTO-ON", the PTO clutch 41 is forced to become "OFF" (disengaged) when the rotary tiller 4 acting as the external work implement is elevated. The PTO clutch 41 comprises a multi-disk friction clutch that is adapted to be engaged when hydraulic pressure is applied, while being disengaged by a spring urging force when hydraulic pressure is released. The hydraulic pressure is controlled through an electromagnetic proportional control valve included in the hydraulic control unit 81.

The touch panel 11 is usable as various operational input devices through a graphic interface, and acts as a PTO mode switch input device in relation to the present invention. In the PTO control system in accordance with the present invention, the mode is selectable between an "independent PTO mode" in which the PTO transmission system transmits PTO power regardless of whether the propelling transmission system is in a power transmittable state or in a power non-transmittable state, and an "interlock PTO mode" in which the PTO transmission system transmits the PTO power only when the propelling transmission system is in the power transmittable state. Selection of the mode is performed using the touch panel 11 in the current embodiment. The state of power transmission in the PTO transmission system is controlled by the hydraulic control unit 81 for adjusting oil supply to the PTO clutch 41 based on the control signal outputted from the PTO-ECU 5, whichever the "independent PTO mode" or "interlock PTO mode" is selected. Thus, either of the "independent PTO mode" and the "interlock PTO mode" is selectable in the PTO-ECU 5. However, operations for breaking power transmission in the PTO transmission system are different between the "independent PTO mode" and "interlock PTO mode", and thus the PTO mode switching operation needs to be performed by the operator's definite intention of switching the mode. In view of this, a restraining function is required for prohibiting switching from the "interlock PTO mode" to the "independent PTO mode" when the PTO-SW 12 is in the ON state, since the PTO transmission system may establish the ON state inadvertently to activate the external work implement 4 when the "interlock PTO mode" is switched to the "independent PTO mode" while the PTO-SW 12 is in the "ON" state, for example. Further, it is preferable to inform the operator that such a restraining function is activated through the LCD 71 of the display panel 70.

Figure 4:
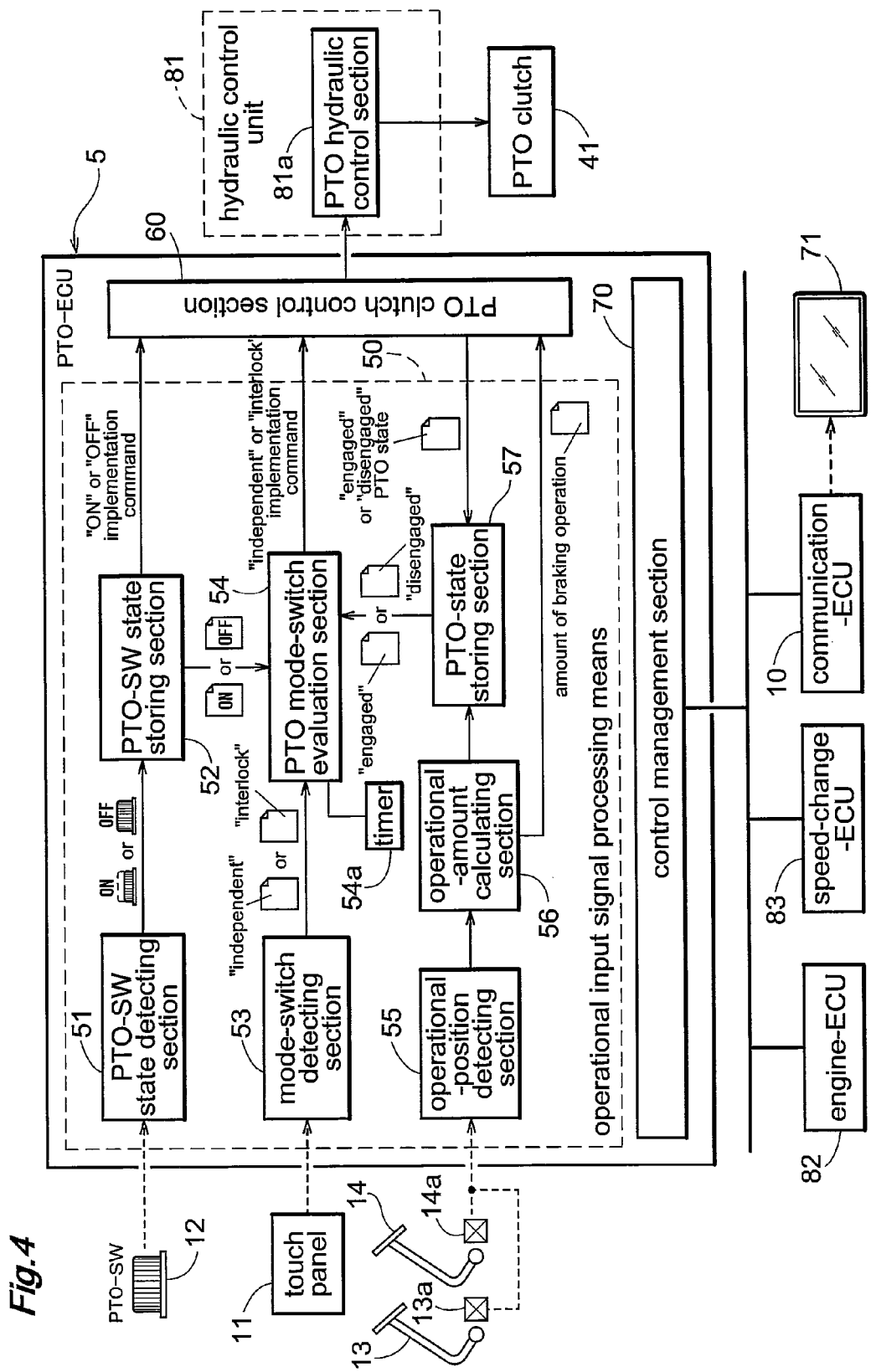
FIG. 4 is a functional block diagram showing functional sections built for the PTO control system in accordance with the present invention.

As shown in FIG. 4, the PTO-ECU 5 includes an operational input signal processing section 50 for processing a signal transmitted from various input devices, a PTO clutch control section 60 for receiving an implementation command as an evaluation of the input signal from the operational input signal processing section 50, and a control management section 70. The control management section 70 is adapted to not only perform data management between the operational input signal processing section 50 and the PTO clutch control section 60 but also perform data input/output management between the PTO-ECU 5 and various peripheral devices.

The operational input signal processing section 50 includes a PTO-SW state detecting section 51, a PTO-SW state storing section 52, a mode-switch detecting section 53, a PTO mode-switch evaluation section 54, an operational-position detecting section 55, an operational-amount calculating section 56, and a PTO-state storing section 57.

The PTO-SW state detecting section 51 is adapted to receive a switch signal from the PTO-SW 12 to confirm the switch mode selected by the operator, that is, an "ON (engaging)" command or an "OFF (disengaging)" command of the PTO clutch 41, store data of the switch mode selected by the operator in the PTO-state storing section 52, and output the "ON (engaging)" command or the "OFF (disengaging)" command to the PTO clutch control section 60 as a control request.

The operational-position detecting section 55 is adapted to detect the operational positions of the brake pedals 13 serving to stop the vehicle and return the HST 31 to the neutral state, based on the sensor signal transmitted from the pedal sensors 13a. The detected results of the depressed positions are converted to pedal operational amount data by the operational-amount calculating section 56 to be transmitted to the PTO clutch control section 60 as the control request. The pedal operational amount data is also used in control of the swash plate of the HST 31 through the hydraulic control unit 81. In the current embodiment, when the brake pedals 13 are depressed beyond a predetermined amount, that is, when the pedal operational amount exceeds a predetermined value, the PTO clutch 41 is forced to be disengaged. Therefore, when the operational-amount calculating section 56 works out the pedal operational amount above the predetermined value, or when the PTO clutch control section 60 receives the pedal operational amount data indicating the predetermined pedal operational amount or above and outputs a control signal for disengaging the PTO clutch to the hydraulic control unit 81, it is regarded that power transmission in the PTO transmission system is broken and data of this transmission-broken state of the PTO transmission system is stored in the PTO-state storing section 57. On the other hand, when the PTO clutch control section 60 outputs a control signal for engaging the PTO clutch, it is regarded that power transmission in the PTO transmission system is established and data of this transmission-established state of the PTO transmission system is stored in the PTO-state storing section 57.

The mode-switch detecting section 53 is adapted to receive a switch signal from the touch panel 11 acting as the mode switch command input device for inputting selection of either of the independent PTO mode (which may be simply referred to as an "independent" hereinafter) and the interlock PTO mode (which may be simply referred to as an "interlock" hereinafter) to recognize which PTO mode has been selected. The switch command to the "independent" or "interlock" detected by the mode-switch detecting section 53 is conveyed to the PTO mode-switch evaluation section 54. The switch command to the "independent" is temporarily suspended (held) in the PTO mode-switch evaluation section 54 when power transmission in the PTO transmission system is established (power transmittable state), while being transmitted to the PTO clutch control section 60 as a PTO mode switch implementation command when power transmission in the PTO transmission system is broken (power non-transmittable state). Such evaluation system prevents the PTO output shaft from starting to rotate at the moment the PTO mode is switched from "interlock" to "independent" using the touch panel 11 to activate the external work implement 4. It should be noted that, when a command to switch to "interlock" is detected, such a command may be immediately transmitted to the PTO clutch control section 60 as the PTO mode switch implementation command relative to the PTO clutch control section 60, or may be transmitted to the PTO clutch control section 60 as the PTO mode switch implementation command only when power transmission in the PTO transmission system is broken (power non-transmittable state) depending on the specifications.

As apparent from the above description, in the current embodiment, the PTO-SW-state storing section 52 is a flag parameter for temporarily storing the current operational state of the PTO-SW 12 detected by the PTO-SW-state detecting section 51, while the PTO-state storing section 57 is a flag parameter for temporarily storing the current power transmission state of the PTO transmission system. The PTO mode-switch evaluation section 54 is a rule-based system adapted to regard the mode switch command received from the mode-switch command input device (touch panel 11 in this embodiment) detected by the mode-switch detecting section 53 and the flag parameters of the PTO-SW-state storing section 52 and the PTO-state storing section 57 as the inputs for evaluation, and output evaluation on whether to provide a PTO mode switching command to the PTO clutch control section 60 immediately or to suspend (hold) it temporarily. Thus, each function of the input signal processing section 50 as noted above may be created by start-up of the program.

Figure 5:
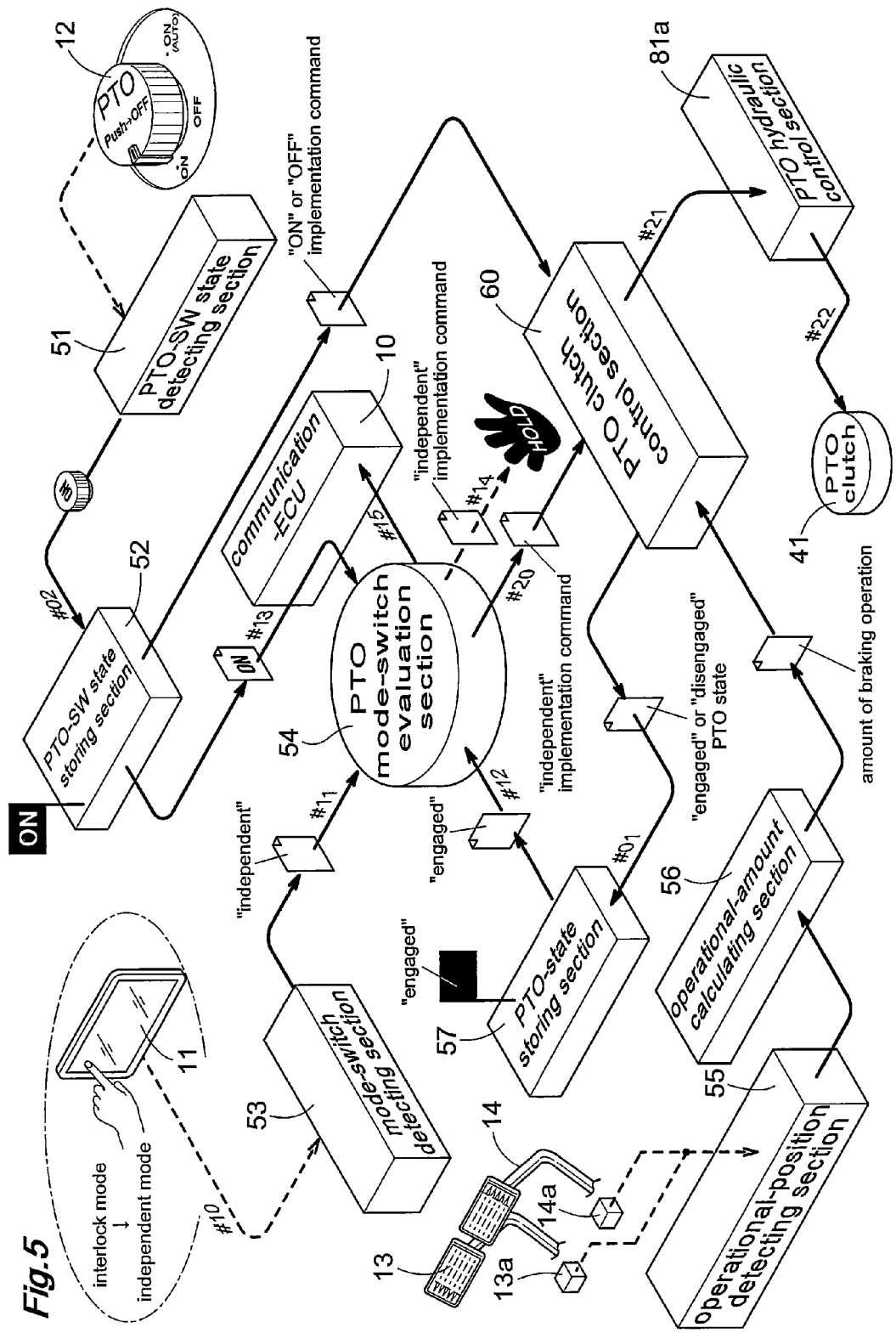
FIG. 5 is an explanatory illustration showing the relationships between control data flows and the individual functional sections.

Next, the data flow in the PTO-ECU 5 will be described in reference to FIG. 5. In this example, the PTO-state storing section 57 sets up an "engaged" flag (#01) to show that the PTO transmission system is engaged based on the PTO state information received from the PTO clutch control section 60, while the PTO-SW-state storing section 52 sets up an "ON" flag (#02) to show that the current operational position of the PTO-SW 12 is "ON" based on the detected information received from the PTO-SW-state detecting section 51. It should be noted that the data of the operational position (ON, OFF, AUTO-ON) of the PTO-SW 12 detected by the PTO-SW-state detecting section 51 is transmitted to the PTO clutch control section 60 as the PTO-SW state information to be used in control of the PTO clutch 41. Provided that the operator performs a switching operation to switch the PTO mode from the interlock PTO mode to the independent PTO mode using the touch panel 11 (#10) in this condition, the mode-switch detecting section 53 receives a signal from the touch panel 11 and detects mode switch from "interlock" to "independent" to provide a mode-switch request to switch to "independent" to PTO mode-switch evaluation section 54 (#11).

The PTO mode-switch evaluation section 54 having received the mode switch request to switch to "independent" from the mode-switch detecting section 53 reads the contents of a flag memory from the PTO-state storing section 57 (#12) and the contents of a flag memory from the PTO-SW-state storing section 52 (#13). Then, it determines whether to immediately provide a command to implement mode switch to "independent" to the PTO clutch control section 60 or to suspend (hold) it temporarily. In the current embodiment, the PTO mode-switch evaluation section 54 is governed by a rule that mode switch from "interlock" to "independent" is prohibited when the PTO transmission system is engaged. Therefore, since the PTO-state storing section 57 sets up the "engaged" flag while the PTO-SW-state storing section 52 sets up the "ON" flag here, feeding the implementation command to switch the mode from "interlock" to "independent" to the PTO clutch control section is suspended or held (#14). In the meantime, the suspension information regarding suspension of the implementation command is transmitted to the communication-ECU 10 where information is produced based on the suspension information (#15). This results in displaying a message of "Perform mode-switch operation after disengaging PTO transmission" in the liquid crystal display 71, for example.

When the PTO transmission is broken by operating the PTO-SW 12 or the brake pedals 13, that is to say, when a "disengaged" flag is set up in the PTO-state storing section 57 or an "OFF" flag is set up in the PTO-SW-state storing section 52, the implementation command to switch the mode from "interlock" to "independent" is fed from the PTO mode-switch evaluation section 54 to the PTO clutch control section

60 (#20). The PTO clutch control section 60 sets the PTO mode to the independent PTO mode based on the implementation command. Thus, when the PTO-SW state information of "ON" detected by the PTO-SW-state detecting section 51 is transmitted, the PTO clutch control section 60 transmits a control signal that the clutch is engaged to a PTO hydraulic control section 81*a* (#21). As a result, the PTO hydraulic control section controls the hydraulic pressure to bring the PTO clutch 41 into the "ON" (engaged) state (#22).

As noted above, when the PTO mode is switched from "interlock" to "independent", the external work implement 4 is driven if the PTO clutch 41 is engaged. Thus, the PTO mode switching operation must be performed by the operator's definite intention. To this end, the following measures are taken in the current embodiment.

(1) The PTO mode-switch evaluation section 54 has a function of a timer 54*a* to allow a predetermined time delay when the implementation command to switch the mode from "interlock" to "independent" is provided to the PTO clutch control section 60.

(2) The signal to switch the PTO mode from "interlock" to "independent" transmitted through the touch panel 11 is generated when the operating time lasts for a predetermined period of time, e.g. when the button is kept depressed for a predetermined period of time. Instead, the signal to switch the mode from "interlock" to "independent" lasting for the predetermined period of time or longer may be transmitted from the touch panel 11 to allow the mode-switch detecting section 53 to receive the PTO mode switch signal.

(3) The operator is alerted visually (by display), aurally (by voice) or both when the operation to switch the PTO mode from "interlock" to "independent" is performed.

(4) When the implementation of the PTO mode switch from "interlock" to "independent" is suspended, the reason for suspension of the implement is displayed through the liquid crystal display 71. For example, it is preferable to display a message of "Disengage the PTO clutch".

In the above embodiment, control of the PTO clutch 41 based on the operation of the brake pedals 13 is disengaging control of the PTO clutch 41 using the amount of operation exceeding the predetermined value as a trigger. Instead of such control, it is also preferable that, based on the amount of a braking operation calculated in the operational-amount calculating section 56, the PTO clutch control section 60 provides the PTO hydraulic control section 81*a* of the hydraulic control unit 81 with a control signal for placing the PTO clutch 41 in a half-engaged state in response to the amount of the braking operation. This arrangement not only allows the PTO clutch 41 to be disengaged by depressing the brake pedals 13 and to be engaged by releasing the depression of the brake pedals 13 even in the absence of any special device dedicated for the PTO clutch 41, but also allows the PTO clutch 41 to be in the half-engaged state by slowly releasing the depression of the brake pedals 13.

Figure 6:
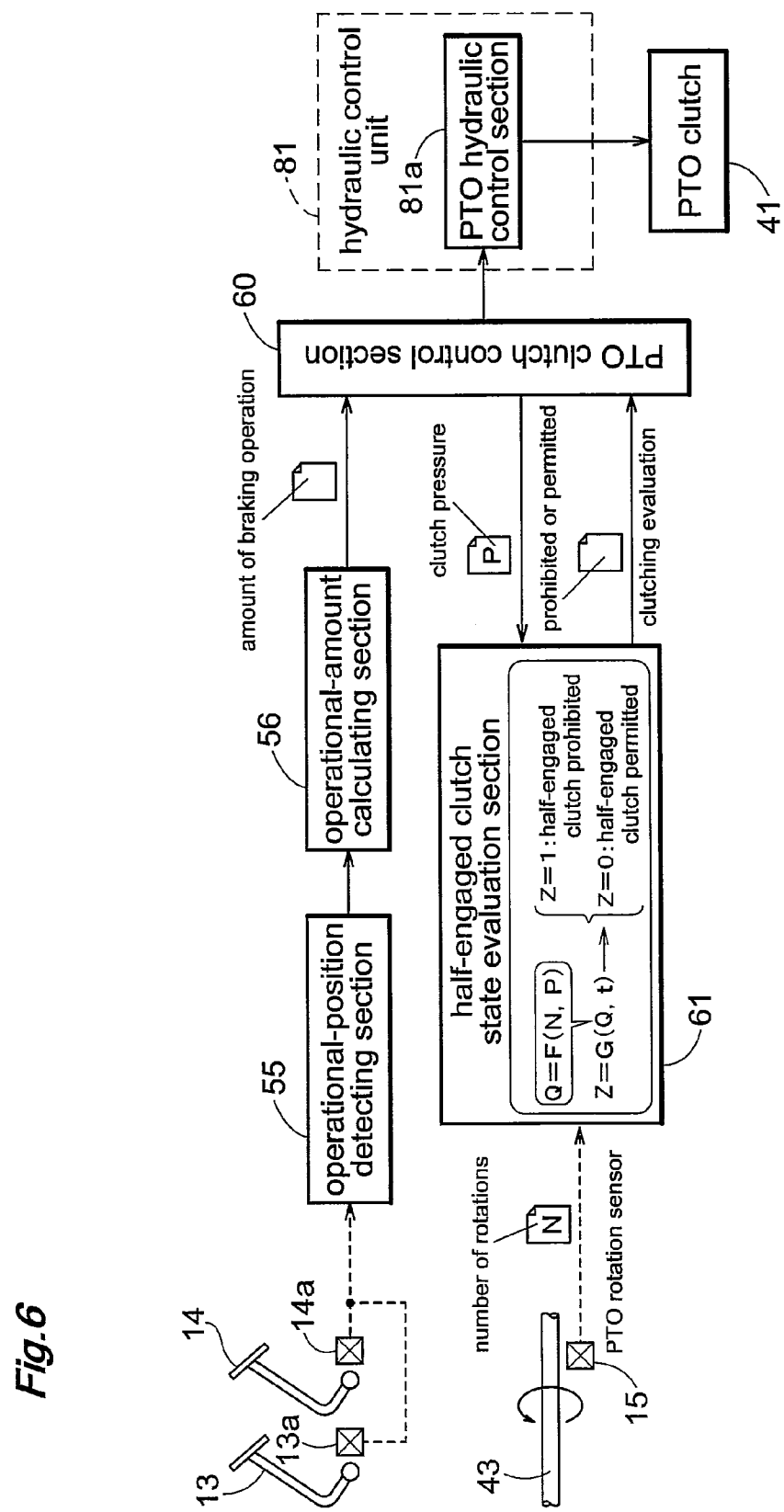
FIG. 6 is a functional block diagram showing a control system for preventing a PTO clutch from being burned.

FIG. 6 shows a functional block diagram showing an example of the half-engaged clutch control. In order to perform such half-engaged clutch control, a PTO rotation sensor 15 for detecting the number of rotations: N of the PTO transmission shaft 43, and a half-engaged clutch state evaluating section 61 are additionally provided. The half-engaged clutch state evaluating section 61 has a function of preventing the PTO clutch 41 from being burned when the half-engaged clutch control is performed for a long period of time. In the half-engaged clutch state evaluating section 61, a function or a table: $Q=F(N,P)$ is established in which Q is a heat value, N is the number of rotations detected by the PTO rotation sensor 15 as an input parameter, and P is clutch pressure calculated by the PTO clutch control section 60 as another input parameter. In addition, an evaluation function: $Z=G(Q,t)$ is established in which the derived heat value Q is integrated with time t to be evaluated based on predetermined standards for evaluation to output evaluation results Z of prohibition of the half-engaged clutch control ($Z=1$) or permission of the half-engaged clutch control ($Z=0$).

In FIG. 6, the evaluation results on the half-engaged clutch control for preventing the clutch from being burned are transmitted to the PTO clutch control section 60. Instead, or in addition to that, the operator may be informed of such evaluation results visually, aurally or both.

Such half-engaged clutch control is advantageous when the external work implement 4 is the rotary tiller. For example, when the rotary tiller plunges into hard soil, the operator may depress the brake pedals 13 and slowly release or loosen the depression on the brake pedals 13 to place the PTO clutch 41 in the half-engaged state, which allows the tiller to pass through the hard soil.

The present invention is usable as the PTO control system in the vehicle which is selectable between either of the independent PTO mode and the interlock PTO mode.

What is claimed is:

1. A Power Take-Off (PTO) control system configured to be mounted on a vehicle, the vehicle comprising:
 a propelling transmission system for transmitting engine output to an axle,
 a brake pedal for placing the propelling transmission system from a power transmitting state to a power non-transmitting state in response to an operation thereof by a predetermined operational amount or more, and
 a PTO transmission system for transmitting the engine output to a PTO transmission shaft through a PTO clutch,
 the vehicle allowing selection between an independent PTO mode in which PTO power is transmitted through the PTO transmission system regardless of whether the propelling transmission system is in the power transmitting state or in the power non-transmitting state, and an interlock PTO mode in which the PTO power is transmitted only when the propelling transmission system is in the power transmitting state,
 the PTO control system comprising:
  a mode-switch command input device for giving an instruction on selection between the independent PTO mode and the interlock PTO mode;
  a PTO setting device having an engaging position for producing an engaging command and a disengaging position for producing a disengaging command of the PTO clutch; and
  a PTO control unit for controlling the PTO clutch in response to a pedal operational position of the brake pedal, a mode selected by the mode-switch command input device, and a position selected by the PTO setting device;
 wherein PTO mode switch implementation processing by the mode-switch command input device from the interlock PTO mode to the independent PTO mode is suspended when the PTO transmission system is in the power transmitting state, while the PTO mode switch implementation processing by the mode-switch command input device to the independent PTO mode is permitted when the PTO transmission system is placed to the power non-transmitting state.

2. The PTO control system as claimed in claim 1, wherein information concerning suspension of the PTO mode switch implementation processing is provided when the PTO mode switch implementation processing is suspended.

3. The PTO control system as claimed in claim 1, wherein the PTO mode switch implementation processing based on the PTO mode switch command provided by the mode-switch command input device is performed after a predetermined delay.

4. The PTO control system as claimed in claim 1, further comprising a PTO electric control unit including a PTO clutch control section for producing a control signal of the PTO clutch, and an operational input signal processing section for processing operational input signals from the mode-switch command input device, the PTO setting device and a brake sensor for detecting the pedal operational position, and outputting an implementation command for requesting the PTO clutch control section to produce the control signal, wherein the operational input signal processing section is provided with a storing section for storing data of the latest state of the PTO setting device and/or data of the latest state concerning power transmission of the PTO transmission system, and wherein the power transmittable state and the power non-transmittable state of the PTO transmission system is determined based on the data of the latest state stored in the storing section, and the implementation command is outputted based on the data of the latest state stored in the storing section and the operational input signal from the mode-switch command input device.

5. The PTO control system as claimed in claim 4, wherein the data of the latest state concerning power transmission of the PTO transmission system is stored based on the control signal produced by the PTO clutch control section.

6. The PTO control system as claimed in claim 4, wherein the data of the latest state concerning power transmission of the PTO transmission system is stored based on an operational input signal from a brake sensor for detecting the pedal operational position.

7. The PTO control system as claimed in claim 1, wherein the suspended PTO mode switch implementation processing to the independent PTO mode is permitted in response to detection of the operation by the brake pedal for placing the propelling transmission system to the power non-transmitting state, or in response to detection of selection of the disengaging position by the PTO setting device.

* * * * *